US006719269B2

United States Patent
Rosas

(10) Patent No.: US 6,719,269 B2
(45) Date of Patent: Apr. 13, 2004

(54) METHOD AND APPARATUS FOR CONSTRUCTING A REGULATABLE FIRE FIGHTING WATER SUPPLY LINE FROM A CONTINUOUSLY PRESSURIZED WATERLINE

(76) Inventor: Ted Rosas, P.O Box 700, Naalehu, HI (US) 96772

( * ) Notice: Subject to any disclaimer, the term of this patent is extended or adjusted under 35 U.S.C. 154(b) by 79 days.

(21) Appl. No.: 09/848,513

(22) Filed: May 3, 2001

(65) Prior Publication Data

US 2002/0162984 A1 Nov. 7, 2002

(51) Int. Cl.[7] ............................................. F16K 51/00
(52) U.S. Cl. ................................... 251/148; 383/382.1
(58) Field of Search .............................. 251/148, 150; 283/382.1–382.7

(56) References Cited

U.S. PATENT DOCUMENTS

| 980,848 | A | * | 1/1911 | Stewart | ....................... 285/342 |
|---|---|---|---|---|---|
| 1,752,193 | A | | 3/1930 | O'Hanlon | |
| 2,176,699 | A | | 10/1939 | Anderson | |
| 2,687,316 | A | * | 8/1954 | Voegeli | .................... 285/382.2 |
| 3,219,367 | A | * | 11/1965 | Franck | ........................ 285/238 |
| 4,155,702 | A | | 5/1979 | Miller | |
| 4,520,872 | A | | 6/1985 | Holman | |
| 4,674,528 | A | | 6/1987 | Nishio | |
| 5,058,619 | A | | 10/1991 | Zheng | |
| 5,058,620 | A | | 10/1991 | Jiles | |
| 5,460,459 | A | | 10/1995 | Morgan | |
| 5,732,728 | A | | 3/1998 | Maichel | |
| 6,105,932 | A | * | 8/2000 | Crook | ......................... 251/152 |
| 6,467,752 | B2 | * | 10/2002 | Woods | ......................... 251/148 |

* cited by examiner

Primary Examiner—Gene Mancene
Assistant Examiner—Melvin A Cartagena
(74) Attorney, Agent, or Firm—Michael R. McKenna

(57) ABSTRACT

Method and apparatus for constructing a regulatable fire fighting water supply line from a continuously pressurized waterline while allowing water to flow freely from said outlet end during its construction.

19 Claims, 1 Drawing Sheet

METHOD AND APPARATUS FOR CONSTRUCTING A REGULATABLE FIRE FIGHTING WATER SUPPLY LINE FROM A CONTINUOUSLY PRESSURIZED WATERLINE

BACKGROUND OF THE INVENTION

On agricultural land in Hawaii and elsewhere, water lines for irrigation are laid out upon the land or just under the surface of the ground in the vicinity of a house or agricultural buildings. Brush fires are common hazzards to housing and such buildings, yet there is no hydrant to supply water in case of a fire. To alleviate this problem, and others which will become apparent from the disclosure which follows, the present invention, a water tapping device, conveniently couples an outlet end of a pressurized waterline to a water regulator while allowing water to flow freely from the outlet end.

The water tapping device comprises a first end with an inlet opening surrounded by a compression receiver operably connected to a shut-off valve that has a hose or nozzle fitting on its discharge end. The compression receiver or coupler has a moveable securing collar on one end and a stationary pipe section joined to the shut-off valve on the other end. Each of the moveable collar and the stationary pipe section has a radially extending handle that when moved to rotate the collar relative to the stationary pipe section can either tighten or loosen the collar to engage or disengage the pressurized line to the water tapping device.

Under hazardous circumstances, a user can cut one of the irrigation water lines at some safe distance from the fire and connect the pressurized end of the cut line to the water tapping device while water is being discharged from said line. This can be done by leaving the shut-off valve open while the compression fitting is tightened. When the watertap is safely secured to the pressurized line, the shut-off valve is closed to allow an appropriately sized secondary line or hose to be connected to the hose fitting on the discharge end of the watertap. Whereupon, the shut-off valve can be opened to allow water to pass through the water tapping device and the secondary hose to fight the fire.

Alternative technology is available in the form of U.S. Pat. No. 5,732,728 issued to Maichel in 1998 for a valve insertion method and assembly for inserting a valve in a line which comprises a method of cutting into a pressurized tube and adding a valve to the tube while pressure is still on the pipe. See also U.S. Pat. No. 4,674,528 issued in 1987 to Nishio et al. for a butterfly valve which discloses the use of a lever actuated valve to allow or deny the flow of a liquid through the valve.

The principal disadvantage of such devices is their cost and the need for an integral clamping means. Moreover, since here we are dealing with a flexible waterline there is no need for a circumferential cutting means.

Furthermore, see U.S. Pat. No. 4,520,872 issued in 1985 to Holman for an emergency firehose switchover device for wells and the like which discloses a method and device to change the water flow of a well type water source to allow access to supply water to a fire hose.

Moreover, U.S. Pat. No. 5,460,459 issued to Morgan in 1995 for a compression fitting for rods, tubes and pipes showing cooperating first and second members. The first member has a circumferential groove which reduces in depth from one end of the groove to the other and the second member is adapted to be located in said groove and to be movable relative thereto and comprising an elongated tapered wedge formed into at least part of a helical coil, whereby relative rotation between said first member and said wedge member establishes a compression fitting to be tightened onto a receiving member.

Also see U.S. Pat. No. 5,508,619 issued in 1991 to Zheng which discloses the use of compression fittings for a valve and nozzle; the valve is a lever actuated bypass valve and the nozzle has a nipple connection outlet to connect the tube or hose. This device is not designed to be installed on a pressurized line.

The citation of the foregoing publications is not an admission that any particular publication constitutes prior art, or that any publication alone or in conjunction with others, renders unpatentable any pending claim of the present application. None of the cited publications is believed to detract from the patentability of the claimed invention.

ADVANTAGES OF THIS INVENTION

Unlike the foregoing devices which teach structures unique to their respective fields of application, the instant invention is ideal for smaller diameter irrigation hoses used in Hawaii and elsewhere. These hoses can be conveniently cut with a cutting instrument such as a knife and the pressurized end can be augmented with an apparatus for coupling an outlet end of a pressurized waterline to a water regulator while allowing water to flow freely from said outlet end. The invention teaches the ability to create a controllable fire fighting water source that can be positioned anywhere along the waterline and controlled locally. Moreover, the apparatus can seal off the outlet end of the pressurized waterline.

The collar preferably has an outwardly extending handle which facilitates rotating the collar to threadingly secure the collar to the coupler, mounting of the collar around the waterline, and stabilizing the waterline for insertion in to the coupler. Also preferred is that the coupler has an outwardly extending arm, so that a user by engaging the handle and the arm can rotate the collar relative to the coupler to threadedly connect the secondary end of the collar to the proximal end of the coupler.

Additionally, the waterline contemplated for use with this important invention does not require any inherent variations in its smooth outer surface to effectuate the coupling.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Still other advantages will be apparent from the disclosure that follows.

SUMMARY OF THE INVENTION

The invention relates to an apparatus and method for coupling an outlet end of a pressurized waterline to a water regulator while allowing water to flow freely from the outlet end comprising an elongated coupler, a collar, and means for securing the waterline to the coupler and collar.

The elongated coupler has a proximal end, a distal end, and a cavity extending from the proximal end to the distal end. The proximal end has a proximal external threaded section proximate thereto. The distal end has a distal external threaded section which extends from the distal end for receiving a water regulator. The collar has a primary end and a secondary end with a recess extending from the primary end to the secondary end. The recess has an internal threaded section proximate to the secondary end. The internal threaded section is adapted for engagement to the proximal external threaded section of the coupler and the recess is suitably sized to receive the outlet end of a pressurized waterline.

The outlet end of a pressurized waterline can be received in to the recess through the primary end of the collar. The collar can be threadedly connected to the proximal end of the coupler to secure the waterline to the coupler and collar by the means for securing, and the distal external threaded section of the coupler can be threadedly connected to a water regulator having an open-flow orientation to allow the pressurized waterline to be coupled to a water regulator while allowing water to flow freely from the outlet end of the waterline.

The collar has an outwardly extending handle and the coupler has an outwardly extending arm, whereby a user by engaging the handle and the arm can rotate the collar relative to the coupler to threadedly connect the secondary end of the collar to the proximal end of the coupler.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWING

Preferred embodiments of the invention are described hereinafter with reference to the accompanying drawing wherein.

DETAILED DESCRIPTION OF THE INVENTION

Figure 1:
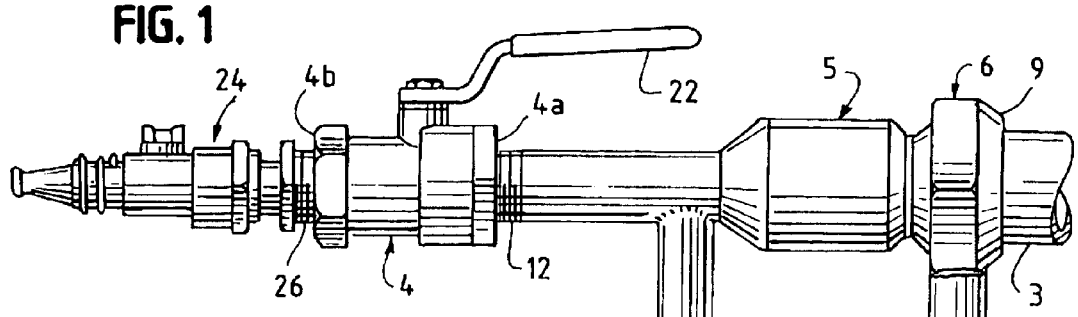
FIG. 1 is a side elevation view of an apparatus for coupling an outlet end of a pressurized waterline of the instant invention showing a water regulator disposed on the distal end of an elongated coupler.
Figure 2:
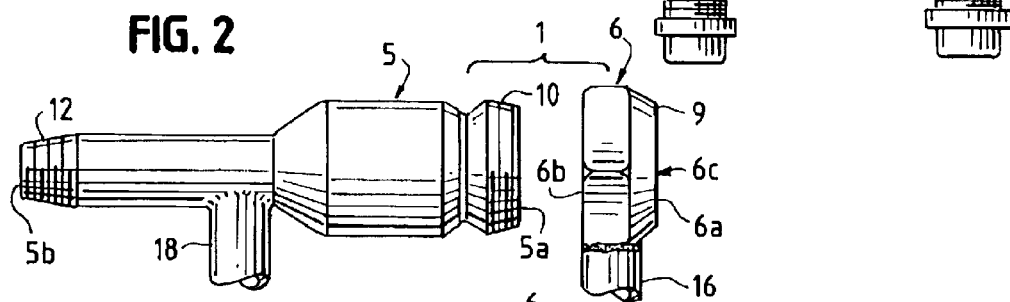
FIG. 2 is an exploded side elevation view of the elongated coupler and a collar of the instant apparatus.

The preferred embodiments depicted in the drawing comprise an apparatus and method for coupling an outlet end of a pressurized waterline to a water regulator while allowing water to flow freely from the outlet end comprising an elongated coupler, a collar, and means for securing the waterline to the coupler and collar.

Without departing from the generality of the invention disclosed herein and without limiting the scope of the invention, the discussion that follows, will refer to the invention as depicted in the drawing.

The preferred embodiments of the apparatus depicted in the drawing comprise an apparatus for coupling 1 an outlet end 2 of a pressurized waterline 3 to a water regulator 4 while allowing water to flow freely from the outlet end comprising an elongated coupler 5, a collar 6, and means for securing 7 the waterline 3 to the coupler 4 and collar 6. The elongated coupler has a proximal end 5a, a distal end 5b, and a cavity 5c extending from the proximal end to the distal end. The proximal end 5a has a proximal external threaded section 10 proximate thereto. The distal end 5b has a distal external threaded section 12 which extends from the distal end for receiving a water regulator 4. The collar 6 has a primary end 6a and a secondary end 6b with a recess 6c extending from the primary end to the secondary end. The recess has an internal threaded section 14 proximate to the secondary end. The internal threaded section 14 is adapted for engagement to the proximal external threaded section 10 of the coupler 5 and the recess 6c is suitably sized to receive the outlet end 2 of a pressurized waterline 3.

The outlet end 2 of a pressurized waterline 3 can be received in to the recess 6c through the primary end 6a of the collar 6. The collar can be threadedly connected to the proximal end 5a of the coupler 5 to secure the waterline 3 to the coupler 5 and collar 6 by the means for securing 7, and the distal external threaded section 12 of the coupler 5 can be threadedly connected to a water regulator 4 having an open-flow orientation, as shown in FIG. 1, to allow the pressurized waterline 3 to be coupled to a water regulator 4 while allowing water to flow freely from the outlet end of the waterline.

Preferably, the collar 6 has an outwardly extending handle 16 and may extend radially along a line perpendicular to a center line 18 of the recess 6c extending from the primary end to the secondary end. The handle 16 facilitates rotating the collar 6 to threadingly secure the collar to the coupler 5, mounting of the collar 6 around the waterline 3, and stabilizing the waterline 3 for insertion in to the coupler 5. Also preferred is that the coupler have an outwardly extending arm 18, which may also extend radially along a line perpendicular to a center line 18 of the cavity 5c extending from the proximal end to the distal end. In the preferred embodiment having both an arm 18 and a handle 16, a user by engaging the handle and the arm can rotate the collar relative to the coupler to threadedly connect the secondary end of the collar to the proximal end of the coupler.

Figure 5:
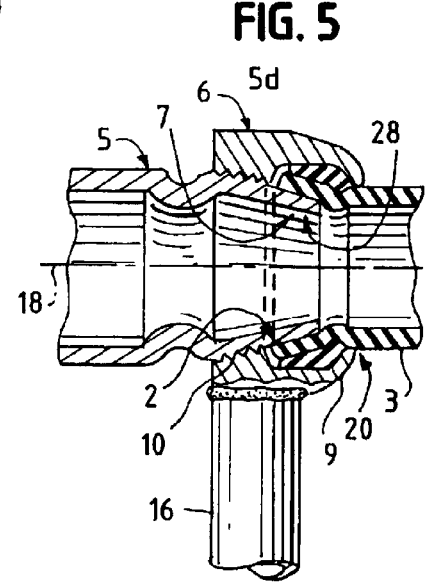
FIG. 5 is a cross-sectional view of another embodiment of the instant invention showing the outlet end of the waterline extruded over a tapered end of the coupler and secured by the collar.

As shown in FIG. 5, the means for securing 7 may comprise a smooth external section 28 extending from the proximal end 5a of the coupler 5 to a distal pass 5d that is adjacent to the proximal external threaded section 10. The smooth external section 28 tapers from the distal pass 5d to the proximal end 5a with a first outer diameter at the distal pass which is greater than the inside diameter of the waterline and with a second outer diameter at the proximal end of the coupler which is less than the inside diameter of the waterline. With a waterline 3 that is sufficiently flexible to allow the outlet end 2 to be extended over and extruded by at least a portion of the smooth external section 28 of the coupler 5, as shown in FIG. 5, an expanded outlet end with an extruded outer diameter exceeding a predetermined extruded dimension can be had. The collar 6 may have an opening 20 for the recess 6c at the primary end 6a which has an inside diameter that is less than the predetermined extruded dimension of the waterline to allow the outlet end 2 of a pressurized waterline 3 to be received in to the recess 6c through the primary end 6a of the collar 6 and extended over and extruded by the proximal end 5a of the coupler 5, and the collar 6 can be threadedly connected to the proximal end of the coupler to attach the collar to the coupler and secure the outlet end of the waterline.

Figure 3:
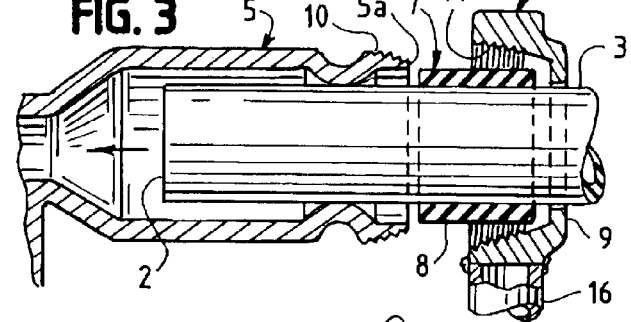
FIG. 3 is a cross-sectional view of the outlet end of the waterline of the instant invention disposed in the coupler and collar and with a sealing ring.
Figure 4:
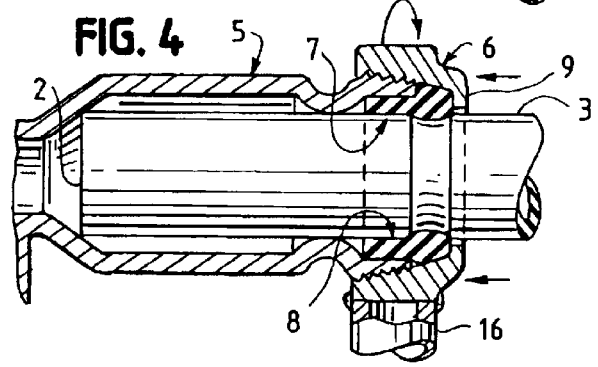
FIG. 4 is a cross-sectional view of the apparatus of the instant invention with the collar attached to the coupler and the sealing ring compressed there between to secure the waterline.

In another preferred embodiment, as shown in FIGS. 3 and 4, the means for securing 7 comprises a compressible seal ring 8 and the collar 6 has a radially inwardly directed shoulder 9. The compressible seal ring 8 has an inside diameter in a relaxed state that is slightly larger than the outside diameter of the waterline, and has an outside diameter that is less than the inside diameter of the shoulder and less than the transverse dimensions of the cavity measured in all directions. The compressible seal ring 8 further has an inside diameter in a compressed state that is less than the outside diameter of the waterline 3, so that the outlet end of a pressurized waterline can be received in to the recess 6c through the primary end of the collar 6, in to the compressible sealing ring 8 and then the collar 6 can be threadedly connected to the proximal end 5a of the coupler 5 with the sealing ring 8 becoming compressed thereby to secure the waterline 3 to the apparatus 1.

Also taught by this vital invention is an apparatus for sealing an outlet end of a pressurized waterline while allowing water to flow freely from the outlet end during installation. It comprises an elongated coupler 5, a collar 6, means for securing 7 the waterline 3 to the coupler and collar, and a water regulator 4.

Referring to FIGS. 1–4, the elongated coupler has a proximal end 5a, a distal end 5b, and a cavity 5c extending from the proximal end to the distal end. The proximal end has a proximal external threaded section 10 proximate thereto, and the distal end has a distal external threaded section 12 extending therefrom for receiving a water regulator 4. The collar has a primary end 6a and a secondary end 6b with a recess 6c extending from the primary end to the secondary end. The recess has an internal threaded section 14 proximate to the secondary end 6b. The internal threaded section 14 is adapted for use on the proximal external threaded section 10 of the coupler, and the recess 6c is suitably sized to receive the outlet end of a pressurized waterline 3. The water regulator 4 has a first end 4a and a second end 4b, and includes a first orientation 22, as shown in FIG. 1, that allows open-flow and a second orientation (when the valve handle is rotated toward a shut position) that regulates flow. The first end 4a includes an internal threaded section for engaging the distal external threaded section 12 of the coupler.

In this way, the outlet end of a pressurized waterline can be received in to the recess through the primary end of the collar and the collar can be threadedly connected to the proximal end of the coupler to sealingly connect the waterline to the coupler and collar. The distal external threaded section of the coupler can be threadedly connected to the water regulator has the first orientation that allows open-flow to allow water to flow freely from the outlet end, through the coupler and through the water regulator while the pressurized waterline is coupled to the water regulator, and the water regulator can then be adjusted to the second orientation to restrict flow and thereby seal the pressurized waterline.

Preferably, the collar 6 has an outwardly extending handle 16 which may extend radially along a line perpendicular to a center line 18 of the recess 6c extending from the primary end to the secondary end. Additionally, the coupler 5 may have an outwardly extending arm 18 which may extend radially along a line perpendicular to a center line 18 of the cavity 5c extending from the proximal end to the distal end. In a preferred embodiment having both an arm and a handle, a user by engaging the handle and the arm can rotate the collar relative to the coupler to threadedly connect the secondary end of the collar to the proximal end of the coupler.

In a preferred embodiment of the apparatus for sealing shown in FIG. 5, the means for securing 7 comprises a smooth external section 28 extending from the proximal end 5a of the coupler 5 to a distal pass 5d that is adjacent to the proximal external threaded section 10, the smooth external section 28 tapers from the distal pass to the proximal end with a first outer diameter at the distal pass which is greater than the inside diameter of the waterline and with a second outer diameter at the proximal end of the coupler which is less than the inside diameter of the waterline, the waterline is sufficiently flexible to allow the outlet end to be extended over and extruded by at least a portion of the smooth external section of the coupler with an extruded outer diameter of the outlet end exceeding a predetermined extruded dimension, and the collar has an opening for the recess at the primary end which has an inside diameter that is less than the predetermined extruded dimension of the waterline.

As shown in FIG. 3 of the drawing, the outlet end 2 of a pressurized waterline 3 can be received in to the recess 6c through the primary end 6a of the collar 6 and extended over and extruded by the proximal end 5a of the coupler 5, the collar can be threadedly connected to the proximal end of the coupler to attach the collar to the coupler and secure the outlet end of the waterline.

Preferably, the second end 4b of the water regulator 4 includes means for directing a flow of water, as shown in FIG. 1. The means for directing a flow of water may comprise a nozzle 24. The second end 4b of the water regulator may include an internal threaded section for engaging a complementary external threaded section 26 of a nozzle 24.

Additionally, as shown in FIG. 3, the apparatus for sealing an outlet end of a pressurized waterline to a water regulator may further comprise a compressible seal ring 8 and the collar 6 may have a radially inwardly directed shoulder 9. The compressible seal ring will have an inside diameter in a relaxed state that is slightly larger than the outside diameter of the waterline and an outside diameter that is less than the inside diameter of the shoulder and less than the transverse dimensions of the cavity measured in all directions. The compressible seal ring will further have an inside diameter in a compressed state that is less than the outside diameter of the waterline. Whereby, the outlet end of a pressurized waterline can be received in to the recess through the primary end of the collar, in to the compressible sealing ring and then the collar can be threadedly connected to the proximal end of the coupler with the sealing ring becoming compressed thereby to secure the waterline to the apparatus.

A complementary method for coupling a water regulator to a section of a pressurized waterline while maintaining a free flow of water in the waterline is also taught by the instant invention. It comprises:

A. cutting the section of a pressurized waterline to provide a receiving end of the waterline and an outlet end 2 of the waterline 3;

B. inserting the outlet end 2 of the waterline 3 in to a recess 6c in a collar 6 with the recess having an internal threaded section 14 proximate to a secondary end 6b;

C. inserting the outlet end of the waterline in to a cavity 5c in an elongated coupler 5 with a proximal external threaded section 10 adapted for use with the internal threaded section 14 of the collar 6;

D. rotating the collar 6 relative to the coupler 5 to threadingly connect collar to the coupler to secure the waterline there between; and E. rotating the coupler having a distal external threaded section 12 disposed proximate to an end that is opposite the proximal external threaded section 10 relative to a water regulator 4, having an open-flow orientation 22, with an internal threaded section 14 adapted for use with the proximal external threaded section 10 of the coupler to threadingly connect the water regulator to the coupler while allowing water to flow freely from the outlet end of the waterline.

The foregoing method for coupling a water regulator 4 to a section of a pressurized waterline 3 may further include rotating the coupler 5 relative to the water regulator 4 comprises engaging an outwardly extending arm 18 of the coupler 5 with one of the hands of a user and engaging an outwardly extending handle 16 of the collar 6 with the other of the hands of the user and moving the arm 18 and the handle 16 in an opposing circular motion to threadingly connect the coupler 5 and the collar 6.

Additionally, the method for coupling a water regulator to a section of a pressurized waterline may further comprise the step of securing the waterline 3 between the coupler 5 and the collar 6, by extruding at least a portion of the outlet end 2 of the waterline 3 through extending the waterline over at least a portion of a smooth tapered external section 28 of the coupler to flexibly expand the outlet end of the waterline to a predetermined expanded outer diameter, and securing the expanded outlet end with a shoulder 9 of the collar 6 having an inside diameter less than the predetermined expanded outer diameter as the collar is threadingly connected to the coupler, as is illustrated in FIG. 5.

Alternatively, the method for coupling a water regulator to a section of a pressurized waterline while maintaining a free flow of water in the waterline may further comprise compressing a compressible seal ring 8 between the coupler 5 and the collar 6 as the coupler is threadingly connected to the collar. It will be obvious to one skilled in the art that the complementary thread arrangements depicted in the drawing could easily be reversed.

A method for constructing a regulatable fire fighting water supply line from a continuous pressurized waterline 3 while allowing water to flow freely from the outlet end 2 during construction is also taught by this invention. It comprises:

a. cutting the continuous section of a pressurized waterline 3 to provide a receiving end of the waterline and an outlet end 2 of the waterline;

b. inserting the outlet end 2 of the waterline 3 in to a recess 6c in a collar 6 with the recess has an internal threaded section 14 proximate to a secondary end 6b;

c. inserting the outlet end of the waterline in to a cavity 5c in an elongated coupler 5 with a proximal external threaded section 10 adapted for use with the internal threaded section 14 of the collar 6;

d. engaging the outlet end of the waterline to a means for securing 7;

e. rotating the collar 6 relative to the coupler 5 to threadingly connect the collar 6 to the coupler 5 to secure the waterline 3 with the means for securing 7 between the collar and the coupler; and f. rotating the coupler 5 having a distal external threaded section 12 disposed proximate to an end that is opposite the proximal external threaded section 10 relative to a water regulator 4, has an open-flow orientation 22, with an internal threaded section adapted for use with the proximal external threaded section 12 of the coupler 5 to threadingly connect the water regulator 4 to the coupler 5 while allowing water to flow freely from the outlet end 2 of the waterline 3.

The method for constructing a regulatable fire fighting water supply line may include rotating the coupler 5 relative to the water regulator 4 comprises engaging an outwardly extending arm 18 of the coupler 5 with one of the hands of a user and engaging an outwardly extending handle 16 of the collar 6 with the other of the hands of the user and moving the arm 18 and the handle 16 in an opposing circular motion to threadingly connect the coupler 5 and the collar 6.

Preferably, the method for constructing a regulatable fire fighting water supply line while maintaining a free flow of water in the waterline comprises the step of securing the waterline 3 between the coupler 5 and the collar 6, by extruding at least a portion of the outlet end 2 of the waterline 3 through extending the waterline over at least a portion of a smooth tapered external section 28 of the coupler 5 to flexibly expand the outlet end 2 of the waterline to a predetermined expanded outer diameter, and securing the expanded outlet end with a shoulder 9 of the collar 6 has an inside diameter less than the predetermined expanded outer diameter as the collar is threadingly connected to the coupler.

Alternatively, in the method for constructing a regulatable fire fighting water supply line while maintaining a free flow of water in the waterline, engaging the outlet end of the waterline 3 to a means for securing 7 and rotating the collar 6 relative to the coupler 5 to threadingly connect collar 6 to the coupler 5 to secure the waterline 3 may comprise compressing a compressible seal ring 8 between the coupler 5 and the collar 6 as the coupler is threadingly connected to the collar.

It is contemplated that the apparatus of this invention can be easily constructed of readily available off the shelf items, including small diameter pipe sections, a valve, adapters, a hose valve, a spray nozzle, a compression receiver (i.e. the elongated coupler), a compression nut, and simple welding operations to connect pipe sections to the coupler and collar to form the arm and handle, respectively.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims. Those skilled in the art will appreciate that the conception upon which this disclosure is base, may readily be utilized as a basis for the designing of other structures, methods and systems for carrying out the several purposes of the present invention. It is important, therefore, that the claims be regarded as including such equivalent constructions insofar as they do not depart from the spirit and scop of the present invention.

My invention resides not in any one of these features per se, but rather in the particular combinations of some or all of them herein disclosed and claimed and it is distinguished from the prior art in these particular combinations of some or all of its structures for the functions specified.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. Apparatus for coupling an outlet end of a pressurized waterline to a water regulator while allowing water to flow freely from said outlet end comprising:
   a. an elongated coupler having a proximal end and a distal end,
      i. said elongated coupler having a cavity extending from the proximal end to the distal end,
      ii. said proximal end having a proximal external threaded section proximate thereto, and
      iii. said distal end having a distal external threaded section extending therefrom for receiving a water regulator;
      said coupler has an outwardly extending arm that extends radially along a line perpendicular to a center line of the cavity extending from the proximal end to the distal end;
   b. a collar having a primary end and a secondary end with a recess extending from the primary end to the secondary end,
      i. said recess having an internal threaded section proximate to the secondary end,
      ii. said internal threaded section being adapted for engagement to the proximal external threaded section of the coupler, and
      iii. said recess being suitably sized to receive the outlet end of the pressurized waterline;
      said collar has an outwardly extending handle that extends radially along a line perpendicular to a center line of the recess extending from the primary end to the secondary end; and
   c. means for securing the waterline to the coupler and collar,
      said apparatus for coupling being capable of being assembled in the field to an outlet end of a pressurized waterline while allowing water to flow freely from said outlet end, with the outlet end of a pressurized waterline received into the recess through the primary end of the collar, and the collar threadedly connected to the proximal end of the coupler to secure the waterline to the coupler and collar by the means for securing,
      whereby, the distal external threaded section of the coupler can be threadedly connected to a water regulator having an open-flow orientation to allow the pressurized waterline to be coupled to a water regulator while allowing water to flow freely from the outlet end of the waterline.

2. The apparatus for coupling an outlet end of a pressurized waterline to a water regulator of claim 1, wherein the outwardly extending handle is substantially longer than the diameter of the pressurized waterline.

3. The apparatus for coupling an outlet end of a pressurized waterline to a water regulator of claim 2, wherein the outwardly extending handle comprises a rod.

4. The apparatus for coupling an outlet end of a pressurized waterline to a water regulator of claim 1, wherein the outwardly extending arm handle is substantially longer than the diameter of the pressurized waterline.

5. The apparatus for coupling an outlet end of a pressurized waterline to a water regulator of claim 4, wherein the outwardly extending arm comprises a rod.

6. The apparatus for coupling an outlet end of a pressurized waterline to a water regulator of claim 1, wherein the outwardly extending arm and the outwardly extending handle are each adapted to fit one of the hands of a user so that
   the user by engaging the handle and the arm can rotate the collar relative to the coupler to threadedly connect the secondary end of the collar to the proximal end of the coupler.

7. The apparatus for coupling an outlet end of a pressurized waterline to a water regulator of claim 1:
   a. wherein the means for securing comprises a smooth external section extending from the proximal end of the coupler to a distal pass that is adjacent to the proximal external threaded section, said smooth external section tapers from the distal pass to the proximal end with a first outer diameter at the distal pass which is greater than the inside diameter of the waterline and with a second outer diameter at the proximal end of the coupler which is less that the inside diameter of the waterline;
   b. wherein the waterline is sufficiently flexible to allow the outlet end to be extended over and extruded by at least a portion of the smooth external section of the coupler with an extruded outer diameter of the outlet end exceeding a predetermined extruded dimension; and
   c. wherein the collar has an opening for the recess at the primary end which has an inside diameter that is less than the predetermined extruded dimension of the waterline,
   whereby, the outlet end of a pressurized waterline can be received in to the recess through the primary end of the collar and extended over and extruded by the proximal end of the coupler, the collar can be threadedly connected to the proximal end of the coupler to attach the collar to the coupler and secure the outlet end of the waterline.

8. The apparatus for coupling an outlet end of a pressurized waterline to a water regulator of claim 1, wherein the means for securing comprises a compressible seal ring, and wherein the collar has a radially inwardly directed shoulder,
   a. said compressible seal ring having an inside diameter in a relaxed state that is slightly larger than the outside diameter of the waterline, and having an outside diameter that is less than the inside diameter of the shoulder and less than the transverse dimensions of the cavity measured in all directions,
   b. said compressible seal ring further having an inside diameter in a compressed state that is less than the outside diameter of the waterline, whereby, the outlet end of a pressurized waterline can be received in to the recess through the primary end of the collar, in to the compressible sealing ring and then the collar can be threadedly connected to the proximal end of the coupler with the sealing ring becoming compressed thereby to secure the waterline to the apparatus.

9. Apparatus for sealing an outlet end of a pressurized waterline while allowing water to flow freely from said outlet end during installation comprising:
   a. an elongated coupler having a proximal end and a distal end,
      i. said elongated coupler having a cavity extending from the proximal end to the distal end,
      ii. said proximal end having a proximal external threaded section proximate thereto, and
      iii. said distal end having a distal external threaded section extending therefrom for receiving a water regulator;
      said coupler has an outwardly extending arm that extends radially along a line perpendicular to a center line of the cavity extending from the proximal end to the distal end;
   b. a collar having a primary end and a secondary end with a recess extending from the primary end to the secondary end,
      i. said recess having an internal threaded section proximate to the secondary end,
      ii. said internal threaded section being adapted for use on the proximal external threaded section of the coupler, and
      iii. said recess being suitably sized to receive the outlet end of the pressurized waterline;
      said collar has an outwardly extending handle that extends radially along a line perpendicular to a center line of the recess extending from the primary end to the secondary end: and
   c. means for securing the waterline to the coupler and collar;
   d. a water regulator with a first orientation that allows open-flow and a second orientation that regulates flow,
      i. said water regulator having a first end and a second end, and
      ii. said first end including an internal threaded section for engaging the distal external threaded section of the coupler,
      said apparatus for coupling being capable of being assembled in the field to an outlet end of a pressurized waterline while allowing water to flow freely from said outlet end, with the outlet end of a pressurized waterline received in to the recess through the primary end of the collar and the collar threadedly connected to the proximal end of the coupler to sealingly connect the waterline to the coupler and collar, and the distal external threaded section of the coupler threadedly connected to the water regulator having the first orientation that allows open-flow to allow water to flow freely from the outlet end, through the coupler and through the water regulator while the pressurized waterline is being coupled to the water regulator, and
      whereby, the water regulator can then be adjusted to the second orientation to restrict flow and thereby seal the pressurized waterline.

10. The apparatus for sealing an outlet end of a pressurized waterline to a water regulator of claim 9, wherein the outwardly extending handle is substantially longer than the diameter of the pressurized waterline.

11. The apparatus for sealing an outlet end of a pressurized waterline to a water regulator of claim 10, wherein the outwardly extending handle comprises a rod.

12. The apparatus for sealing an outlet end of a pressurized waterline to a water regulator of claim 11, wherein the outwardly extending arm extends radially along a line perpendicular to a center line of the cavity extending from the proximal end to the distal end,
   whereby, a user by engaging the handle and the arm can rotate the collar relative to the coupler to threadedly connect the secondary end of the collar to the proximal end of the coupler.

13. The apparatus for sealing an outlet end of a pressurized waterline to a water regulator of claim 9, wherein the outwardly extending arm is substantially longer than the diameter of the pressurized waterline.

14. The apparatus for sealing an outlet end of a pressurized waterline to a water regulator of claim 13, wherein the outwardly extending arm comprises a rod.

15. The apparatus for sealing an outlet end of a pressurized waterline to a water regulator of claim 9:
   a. wherein the means for securing comprises a smooth external section extending from the proximal end of the coupler to a distal pass that is adjacent to the proximal external threaded section, said smooth external section tapers from the distal pass to the proximal end with a first outer diameter at the distal pass which is greater than the inside diameter of the waterline and with a second outer diameter at the proximal end of the coupler which is less than the inside diameter of the waterline;
   b. wherein the waterline is sufficiently flexible to allow the outlet end to be extended over and extruded by at least a portion of the smooth external section of the coupler with an extruded outer diameter of the outlet end exceeding a predetermined extruded dimension; and
   c. wherein the collar has an opening for the recess at the primary end which has an inside diameter that is less than the predetermined extruded dimension of the waterline,
   whereby, the outlet end of a pressurized waterline can be received in to the recess through the primary end of the collar and extended over and extruded by the proximal end of the coupler, the collar can be threadedly connected to the proximal end of the coupler to attach the collar to the coupler and secure the outlet end of the waterline.

16. The apparatus for sealing an outlet end of a pressurized waterline to a water regulator of claim 9, wherein the second end of the water regulator includes means for directing a flow of water.

17. The apparatus for sealing an outlet end of a pressurized waterline to a water regulator of claim 16, wherein the means for directing a flow of water comprises a nozzle.

18. The apparatus for sealing an outlet end of a pressurized waterline to a water regulator of claim 9, wherein the second end of the water regulator includes an internal threaded section for engaging a complementary external threaded section of a nozzle.

19. The apparatus for sealing an outlet end of a pressurized waterline to a water regulator of claim 9, further comprising a compressible seal ring, and wherein the collar has a radially inwardly directed shoulder, a. said compressible seal ring having an inside diameter in a relaxed state that is slightly larger than the outside diameter of the waterline, and having an outside diameter that is less than the inside diameter of the shoulder and less than the transverse dimensions of the cavity measured in all directions, b. said compressible seal ring further having an inside diameter in a compressed state that is less than the outside diameter of the waterline, whereby, the outlet end of a pressurized waterline can be received in to the recess through the primary end of the collar, in to the compressible sealing ring and then the collar can be threadedly connected to the proximal end of the coupler with the sealing ring becoming compressed thereby to secure the waterline to the apparatus.

* * * * *